United States Patent [19]
Lamparter

[11] Patent Number: 5,357,239
[45] Date of Patent: Oct. 18, 1994

[54] ACTUATING DEVICE FOR BUS SAFETY GATE AND STOP SIGN

[75] Inventor: Ronald C. Lamparter, Grosse Pointe Shores, Mich.

[73] Assignee: Transpec, Inc., Troy, Mich.

[21] Appl. No.: 61,722

[22] Filed: May 17, 1993

[51] Int. Cl.$^5$ ............................................. B60Q 1/26
[52] U.S. Cl. .................... 340/433; 340/480; 340/487; 318/282; 318/281
[58] Field of Search ........ 340/480, 483, 487, 488–490, 340/433; 116/63 R, 28 R; 318/282

[56] References Cited

U.S. PATENT DOCUMENTS

| | | | |
|---|---|---|---|
| 4,559,518 | 12/1985 | Latta | 340/433 |
| 4,766,413 | 8/1988 | Reavell | 340/130 |
| 4,816,804 | 3/1989 | Reavell | 340/433 |
| 4,956,630 | 9/1990 | Wicker | 340/433 |
| 4,983,949 | 1/1991 | Wicker | 340/433 |
| 5,132,662 | 7/1992 | Burch | 340/433 |
| 5,199,754 | 4/1993 | Freeman | 340/433 |

Primary Examiner—John K. Peng
Assistant Examiner—Daryl C. Pope
Attorney, Agent, or Firm—Reising, Ethington Barnard, Perry & Milton

[57] ABSTRACT

An actuating device (10) for operating a safety unit (12) mounts on a vehicle (14) and moves between a retracted position adjacent the vehicle and an extended position extending outwardly from the vehicle. A housing (16) is fixedly mounted on the vehicle and a bracket (18) is pivotably mounted on the housing for movement about a predetermined pivot axis between the retracted and the extended positions. The actuating device (10) also includes a drive mechanism (20) for pivoting the bracket (18) about the pivot axis between the retracted position and the extended position. A torsional spring (22) is mounted about the pivot axis and torsionally interconnects the bracket (18) and the drive mechanism (20) for allowing relative movement therebetween when a predetermined force is applied to the bracket.

21 Claims, 3 Drawing Sheets

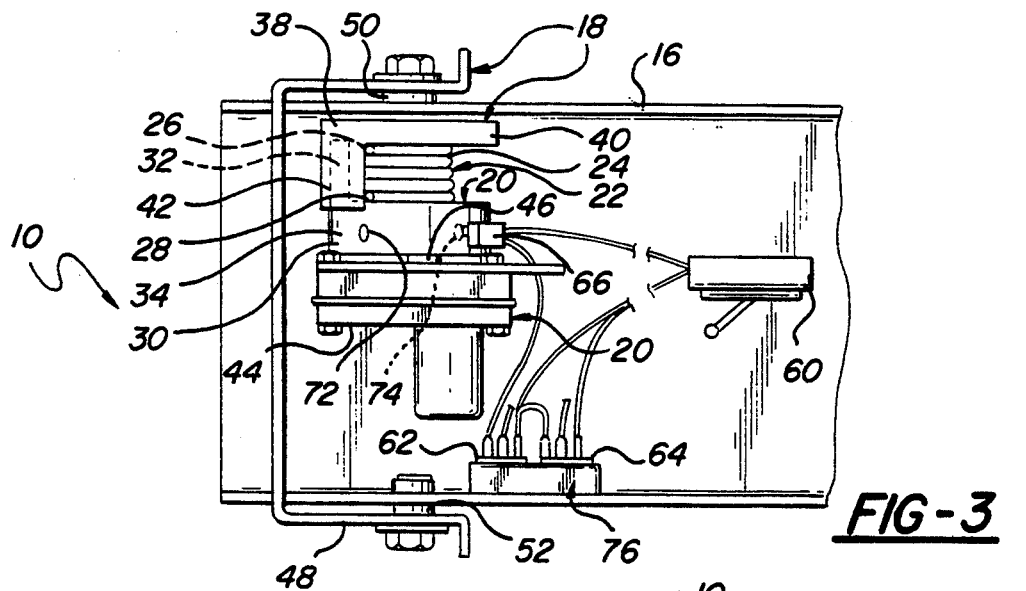
*FIG-3*
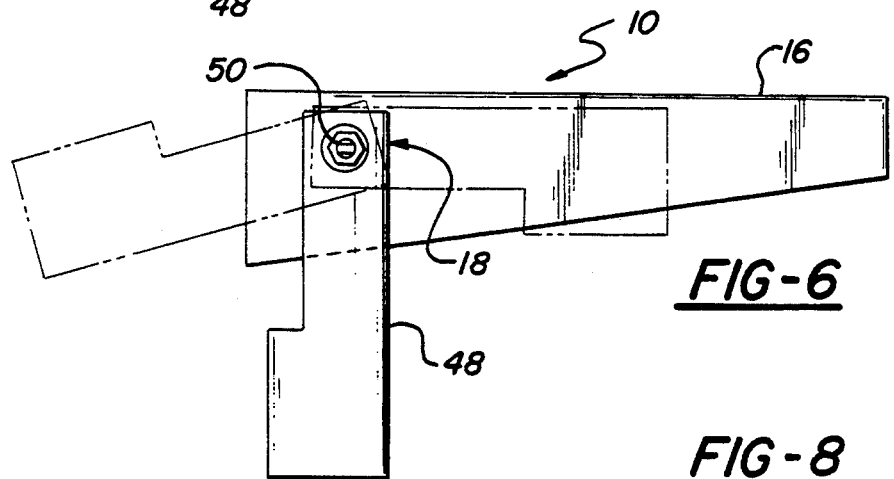
*FIG-6*
*FIG-8*
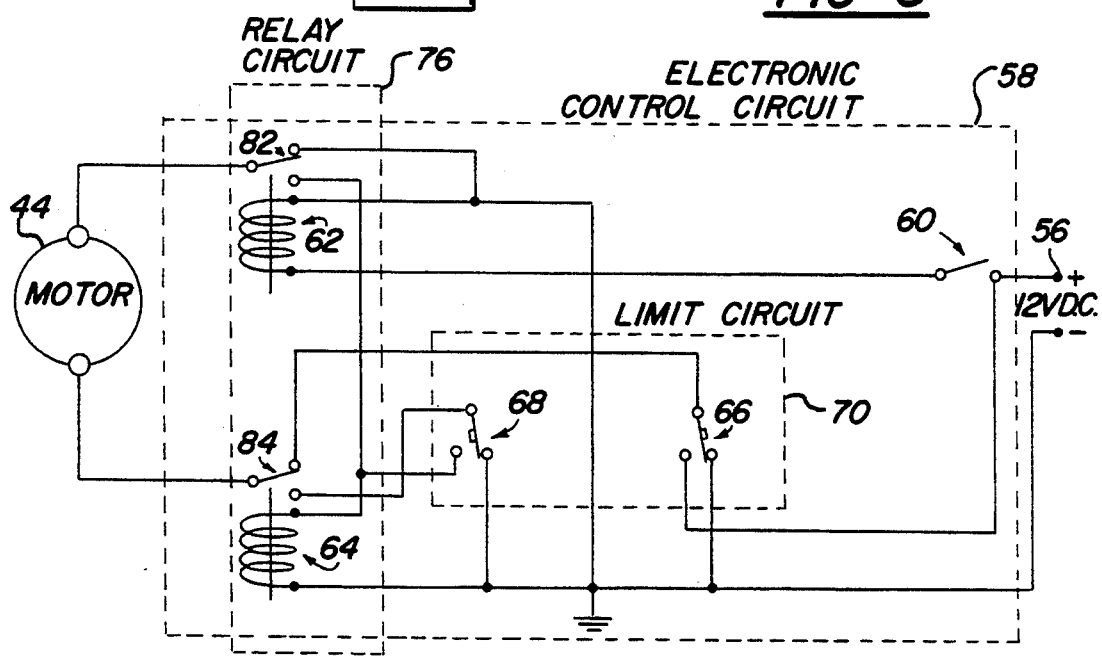

ACTUATING DEVICE FOR BUS SAFETY GATE AND STOP SIGN

TECHNICAL FIELD

The subject invention relates to electro-mechanical assemblies mounted on school buses to selectively move safety units such as crossing or safety gates and STOP signs between retracted positions and extended or operative positions.

BACKGROUND OF THE INVENTION

School buses include safety units mounted in different locations for performing two main functions: first, some school buses include an indicator which may extend out from the side of the bus to alert traffic to stop when the bus is stopped; second, some buses also include an elongated gate mounted on the front of the bus for directing children around the front of the bus and in a predetermined path visible to the driver, preventing children from lingering directly in front of the bus where the driver cannot see. The same mechanism may be used for mounting and controlling the movement of both safety units, i.e. the indicator and the elongated gate. The mechanism typically includes a motor and a bracket interconnected by some type of clutch mechanism, with an electronic control circuit for controlling the motor to move the bracket, and thus the attached safety unit, between a retracted position and an extended position. The clutch mechanism allows movement of the bracket with respect to the motor when a force acts on the bracket. Such a force may result when the safety unit is left extended, and the safety unit hits a tree or another vehicle.

Several types of clutch mechanisms are shown in the prior art. U.S. Pat. No. 4,983,949 to Wicker, for example, teaches a slip clutch which disengages the pivot arm from the drive mechanism when a predetermined force acts on the pivot arm; however, this mechanism is unnecessarily complex and expensive to manufacture. U.S. Pat. No. 4,766,413 to Reavell teaches a drive mechanism interconnected with a safety gate by means of a lever arm and a compression spring for allowing relative rotation between the safety unit and the drive mechanism; however, this mechanism is also unnecessarily complex and expensive to manufacture.

SUMMARY OF THE INVENTION AND ADVANTAGES

An actuating device for operating a safety unit mounted on a vehicle and moveable between a retracted position adjacent the vehicle and an extended position extending outwardly from the vehicle comprises a housing fixedly mounted on the vehicle and a bracket pivotably mounted on the housing for movement about a predetermined pivot axis between the retracted and the extended positions. The assembly also includes drive means for pivoting the bracket about the pivot axis between the retracted position and the extended position. The assembly is characterized by a torsional spring mounted about the pivot axis and torsionally interconnecting the bracket and the drive means for allowing relative movement therebetween when a predetermined force is applied to the bracket.

Such an assembly therefore includes a very simple and inexpensive mechanism for allowing the bracket to move relative to the drive means in order to avoid damaging the drive means when an external force acts on the safety unit and the bracket.

FIGURES IN THE DRAWINGS

Other advantages of the present invention will be readily appreciated as the same becomes better understood by reference to the following detailed description when considered in connection with the accompanying drawings wherein:

FIG. 3 is a front view of the subject assembly with the bracket fully extended;

FIG. 6 is a top view of the subject assembly;

FIG. 8 is schematic diagram of the electrical circuit controlling the movement of the bracket.

DESCRIPTION OF THE PREFERRED EMBODIMENT

Figure 1:
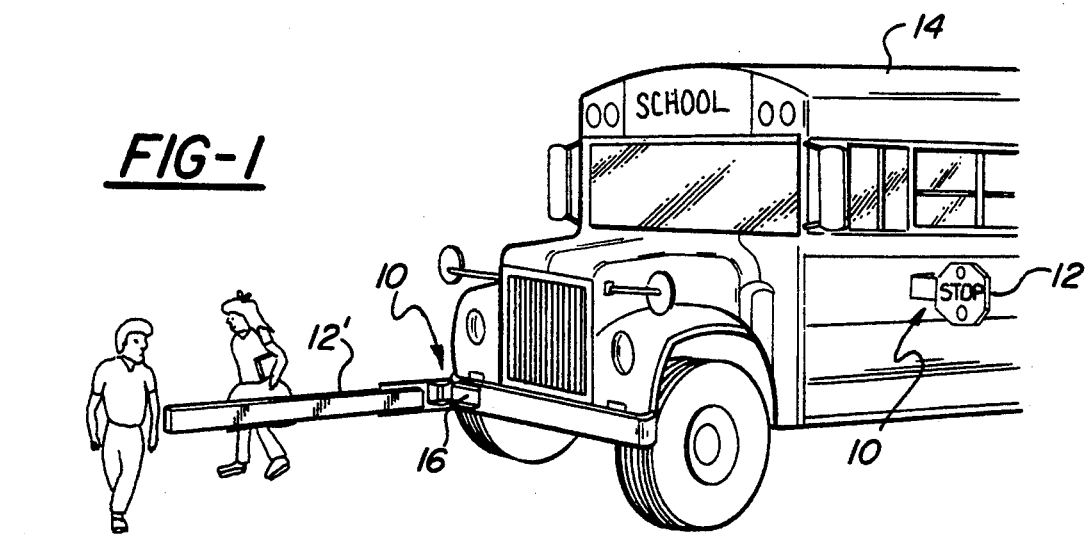
FIG. 1 is a view of a school bus showing the subject invention used to support a STOP sign indicator on the side of the bus and an elongated safety gate on the front of the bus.
Figure 2:
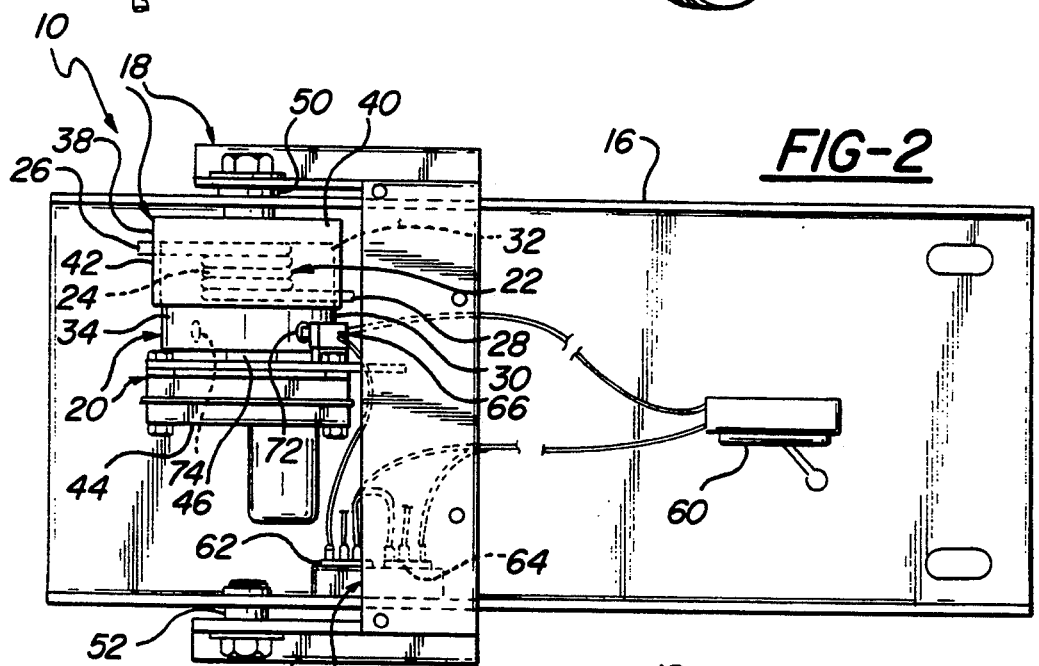
FIG. 2 is a front view of the subject assembly with the bracket retracted and with the cover removed to show the drive means, the pivot means and the spring.
Figure 4:
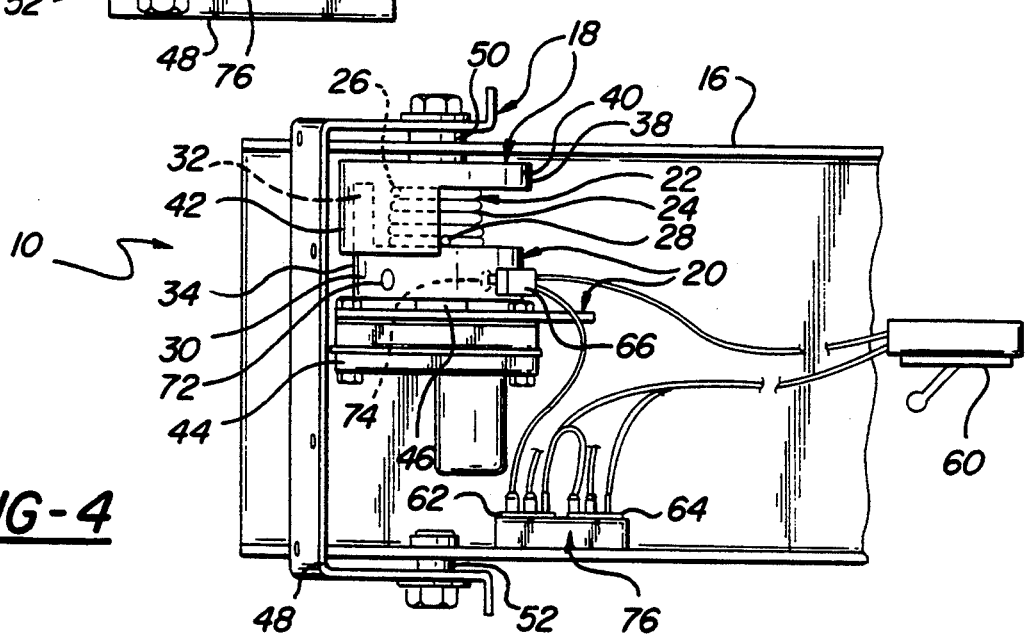
FIG. 4 is a front view of the subject invention with the bracket in a position biased away from the extended position and placing a load on the spring.
Figure 5:
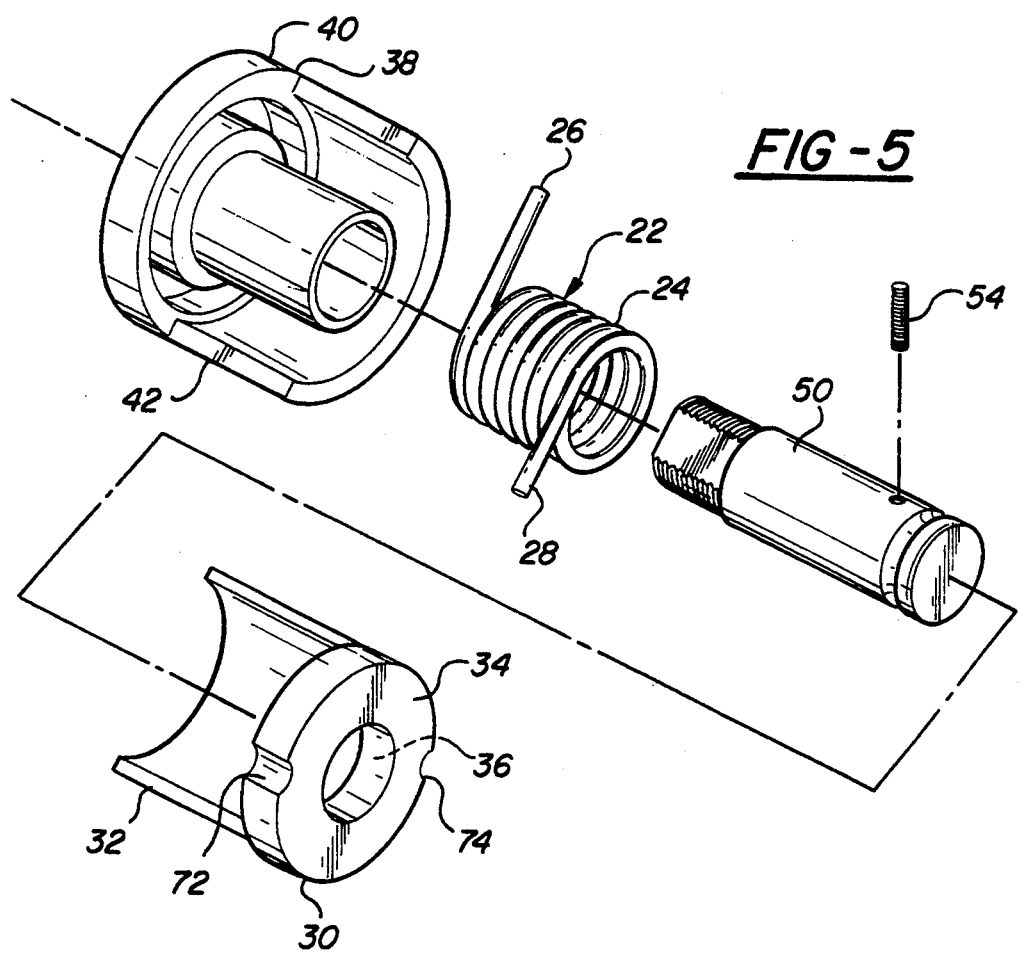
FIG. 5 is an exploded view of the drive member, the spring engager and the spring.

Referring to the Figures wherein like numerals indicate like or corresponding parts throughout the several views, an actuating device is generally shown at 10. The actuating device 10 operates a safety unit 12,12' between a retracted position adjacent a vehicle 14 and an extended position extending outwardly from the vehicle. The actuating device 10 comprises a housing 16 fixedly mounted on the vehicle 14 and a bracket generally indicated at 18 pivotably mounted on the housing for movement about a predetermined pivot axis between the retracted and the extended positions. The actuating device 10 also includes drive means generally indicated at 20 for pivoting the bracket 18 about the pivot axis between the retracted position and the extended position. The actuating device is characterized by a torsional spring generally indicated at 22 mounted about the pivot axis and torsionally interconnecting the bracket 18 and the drive means 20 for allowing relative movement therebetween when a predetermined force is applied to the bracket.

The torsional spring 22 is a helical torsional spring having a central axis, a plurality of coils 24 centered about the central axis and first and second ends 26,28 extending outwardly from the coils. The central axis of the spring 22 is coincidental with the pivot axis.

The drive means 20 includes a drive member 30 rotatably mounted about the pivot axis. The drive member 30 includes abutting means 32 for alternatively abutting one of the first and second ends 26,28 of the spring 22. The drive member 30 includes a substantially cylindrical portion 34 having a first end surface and a spaced apart and parallel second end surface, the abutting means 32 of the drive member includes an arcuate flange extending away from the first end surface coaxial with the cylindrical portion. The arcuate flange 32 extends axially from the outer periphery of the cylindrical portion 34. In other words, the outer diameter of the arcuate flange 32 is roughly equal to the outer diameter of the cylindrical portion 34. The cylindrical portion 34 and the arcuate flange 32 of the drive member 30 are typically molded together as a piece of hard plastic.

The drive member 30 includes an elongated member 36 extending radially outward from the cylindrical portion 34. This elongated member 36 is a peg which limits rotation of the drive member 30 by abutting the housing 16 or something attached to the housing when the drive member rotates past a predetermined point.

The bracket 18 includes a spring engager 38 disposed to rotate about the pivot axis for engaging one of the first and second ends 26,28 of the spring 22. The spring engager 38 includes a substantially cylindrical portion 40 having a first end surface and a spaced apart and parallel second end surface. The spring engager 38 further includes an arcuate flange 42 extending away from the first end surface coaxial with the cylindrical portion 40. The arcuate flange 42 of the spring engager 38 extends radially away from the cylindrical portion 40 at the outer periphery of the cylindrical portion. Said another way, the arcuate flange 42 has an outer diameter roughly equal to the outer diameter of the cylindrical portion 40. The outer diameter of the cylindrical portion 40 and the arcuate flange 42 is greater than the corresponding parts 32,34 on the drive member 30. The arcuate flange 42 and the cylindrical portion 40 are molded together as a piece of hard plastic.

The drive member 30 and the spring engager 38 are disposed adjacent one another coaxially along the pivot axis with the arcuate flanges 32,42 disposed therebetween. The arcuate flange 42 on the spring engager 38 has a greater diameter than the diameter of the arcuate flange 32 on the drive member 30. The arcuate flanges 32,42 are spaced apart radially from one another, and the torsional spring 22 is disposed within the space defined by rotation of the spring engager 38 and the drive member 30. The first and second ends 26,28 of the spring 22 extend outside the space defined by rotation of the spring engager 38. In this manner, the ends of the spring 22 will engage the arcuate flanges on the drive member 30 and the spring engager 38, respectively, when either of them rotates a certain amount.

The drive means 20 includes an electric drive motor 44 attached to the drive member 30 for rotating the drive member 30 about the pivot axis. The drive motor 44 may be any suitable motor, e.g. a permanent magnet d.c. gear motor. The motor 44 includes a drive shaft 46 around which the drive member 30 may be disposed and fixed by means of a set screw.

The bracket 18 comprises a pivot arm 48 fixedly attached to the spring engager 38 and extending from the spring engager to a distal end. The pivot arm 48 pivotably attaches to the housing 16 by means of first and second bolts 50,52. The spring engager 38 attaches to the first bolt 50, and thus indirectly to the bracket 18, by means of a set screw 54.

The safety unit 12,12' is mounted on the pivot arm 48 at the distal end of the pivot arm. The safety unit may include an indicator or semaphore 12 having an indicia of a conventional STOP sign. The safety unit may also include an elongated member 12' comprising a safety gate or crossing arm.

The elongated member 12' is preferably a solid bar having a length shorter than the width of the bus 14. The safety gate or crossing arm 12' swings out away from the front of the bus to effect a barrier to prevent children from stopping directly in front of the bus where the driver cannot see.

A power source 56 powers the drive motor. The power source 56 is typically a 12 volt battery which powers other electrical devices on the bus.

An electrical control circuit 58 is interposed between the power source 56 and the drive motor 44 for controlling the drive motor to selectively move the bracket 18 between the retracted and extended positions.

The electrical control circuit 58 includes an activation switch 60 movable between a first position in which the drive motor 44 drives the bracket 18 from the retracted to the extended position and a second position in which the drive motor drives the bracket from the extended to the retracted positions. The actuation switch 60 connects to the power source 56, each of two relays 62,64 and each of two limit switches 66,68.

Figure 7A:
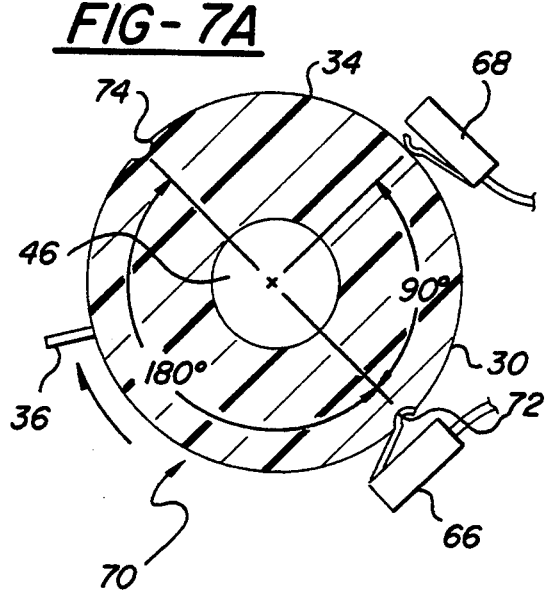
FIGS. 7A and 7B are cross-sectional views of the drive member showing the cam surfaces on the drive member interacting with the limit switches.
Figure 7B:
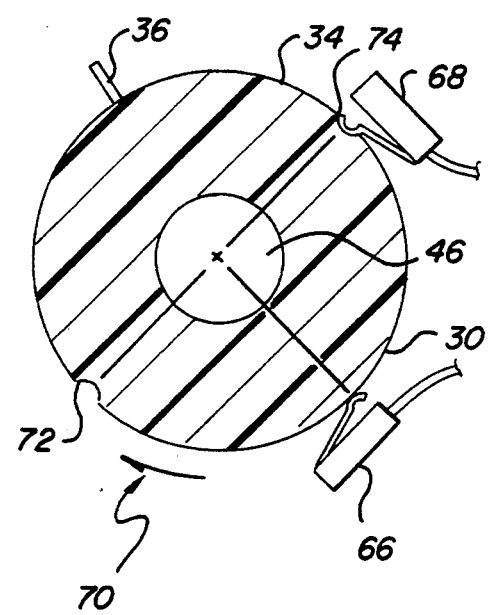

The control circuit comprises limit means generally shown at 70 for de-activating the drive motor 44 when the bracket 18 has reached one of the extended and retracted positions. The limit means 70 includes first and second limit switches 66,68. As shown in FIGS. 7A and 7B, these limit switches 66,68 are placed adjacent the rotating drive member 30, which includes first and second cam surfaces 72,74 spaced apart 180 degrees around the circumference of the drive member 30. The limit switches 66,68 are spaced apart from each other about ninety degrees around the circumference of the drive member 30. When one of the switches 66,68 engages a cam surface 72,74 it will stop the motor. This occurs after the pivot arm 48 rotates through a ninety degree path, which is the distance between the retracted and extended positions. Thus, the first limit switch 66 stops the drive motor 44 when the bracket 18 is in the retracted position. The second limit switch 68 stops the drive motor 44 when the bracket 18 is in the extended position. The first limit switch 66 connects to the activation switch 60, the second of two relays 64 and ground. The second limit switch 68 connects to ground and each of the relays 62,64.

Relay means generally indicated at 76 switches the direction of electrical current passing through the drive motor 44 when the activation switch 60 is moved between the first and second positions. The relay means 76 includes two relays 62,64 each electrically connected between the activation switch 60 and ground. Each of the two relays 62,64 includes a wire coil and a plunger such that the plunger moves axially with respect to the wire coil when electrical current passes though the wire coils. The first relay 62 operates a first drive motor switch 82 between a ground position and an activation switch position. The second relay 64 operates a second drive motor switch 84 between a first limit switch position associated with the first limit switch 66 and a second limit switch position associated with the second limit switch 68. The first relay 62 connects to the motor 44, ground, the second relay 64, the actuation switch 60 and the second limit switch 68. The second relay 64 connects to the motor 44, ground, the first relay 62, the actuation switch 60 and both limit switches 66,68.

In operation, assume the safety unit 12,12' is in the retracted position. The activation switch 60 is moved into the first position and current flows through the system to activate the relays 62,64 which close the drive motor switches 82,84. Current thus flows in a first direction across the motor 44 to ground. Referring to FIG. 8, current flows from top to bottom across the motor 44. At this point the drive member 30 begins to move and the first limit switch 66 switches. When the drive member 30 rotates ninety degrees, thus moving the safety unit 12,12' into the extended position, the second limit switch 68 will switch and thereby de-activate the motor. The relays 62,64, meanwhile remain activated as long as the activation switch 60 is in the first position.

If the safety unit 12,12', now in the extended position, experiences any forces such as from another vehicle, a tree, a street sign, etc., the safety unit, the pivot arm 48 and the spring engager 38 will all rotate together, and the arcuate flange 42 on the spring engager will engage one end of the spring 22. The spring 22 will rotate until the other end of the spring abuts the arcuate flange 32 on the drive member 30. The drive member 30, attached to the motor 44, will rotate only under a predetermined force. However, the spring 22 is designed to twist at a force threshold lower than this predetermined force to absorb any force acting on the safety unit 12,12', and to prevent the drive member 30 from rotating. When the force acting on the safety gate ceases, the spring 22 will force the safety unit back 12,12' into the extended position.

In order to move the safety unit 12,12' back into the retracted position, one merely moves the activation switch 60 from the first position to the second position. At this point current ceases to flow through the relays 62,64 and the drive motor switches 82,84 switch back to their neutral positions. Current thus flows across the motor 44 in a second direction, as shown in FIG. 7, from bottom to top. As the drive member 30 begins to rotate, the second limit switch 68 switches. When the drive member 30 has rotated ninety degrees the first limit switch 66 engages one of the cam surfaces 72,74 on the drive member 30 and switches to cut off the current flow to the motor 44.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. An actuating device (10) for operating a safety unit (12,12') mounted on a vehicle (14) and moveable between a retracted position adjacent the vehicle and an extended position extending outwardly from the vehicle, said actuating device (10) comprising:
   a housing (16) fixedly mounted on said vehicle (14);
   a bracket (18) pivotably mounted on said housing (16) for movement about a predetermined pivot axis between said retracted and said extended positions;
   drive means (20) for pivoting said bracket (18) about said pivot axis between said retracted position and said extended position;
   a helical torsion spring (22) having a plurality of coils (24), said spring being mounted about said pivot axis and torsionally interconnecting said bracket (18) and said drive means (20) to translate motion from said drive means to said bracket and to allow relative movement between said bracket and said drive means when a predetermined force is applied to said bracket (18);
   characterized by including coiling means (32,42) for loading said spring (22) in a coiling direction whenever said bracket moves relative to said drive means so that said spring (22) will never be weakened by uncoiling.

2. An actuating device (10) as set forth in claim 1 further characterized by said torsion spring (22) having first and second ends (26,28) extending radially outwardly from said coils.

3. An actuating device (10) as set forth in claim 2 further characterized by said drive means (20) including a drive member (30) rotatably mounted about said pivot axis, said drive member including abutting means (32) for alternatively abutting said first and second ends of said spring (22) to drive said bracket from one of said retracted and extended positions to the other of said positions.

4. An actuating device (10) as set forth in claim 3 further characterized by said bracket (18) including a spring engager (38) disposed to rotate about said pivot axis for engaging one of said first and second ends (26,28) of said spring (22).

5. An actuating device (10) as set forth in claim 4 further characterized by said drive member (30) including a cylindrical portion (34) having a first end surface and a spaced apart and parallel second end surface, said abutting means (32) of said drive member including an arcuate flange extending away from said first end surface coaxial with said cylindrical portion.

6. An actuating device (10) as set forth in claim 5 further characterized by said spring engager (38) including a substantially cylindrical portion (40) having a first end surface and a spaced apart and parallel second end surface, said spring engager (38) further including an arcuate flange (42) extending away from said first end surface coaxial with said cylindrical portion, said coiling means including said arcuate flange (42) of said spring engager (38) and said arcuate flange (32) of said drive member (30).

7. An actuating device (10) as set forth in claim 6 further characterized by said drive member (30) and said spring engager (38) being disposed adjacent one another coaxially along said pivot axis with said arcuate flanges (32, 42) disposed therebetween, said arcuate flange (42) on said spring engager having a greater diameter than said diameter of said arcuate flange (32) on said drive member (30), said arcuate flanges being spaced apart radially from one another, said torsional spring (22) disposed within the space defined by rotation of said spring engager (38) and said drive member with said first and second ends (26,28) extending outside the space defined by rotation of said spring engager.

8. An actuating device (10) as set forth in claim 4 further characterized by said drive means (20) including an electric drive motor (44) attached to said drive member (30) for rotating said drive member about said pivot axis.

9. An actuating device (10) as set forth in claim 4 further characterized by said bracket (18) comprising a pivot arm (48) fixedly attached to said spring engager (38).

10. An actuating device (10) as set forth in claim 8 further characterized by including a power source (56) to power said drive motor (44).

11. An actuating device (10) as set forth in claim 10 further characterized by including an electrical control circuit (58) interposed between said power source (56) and said drive motor (44) for controlling said drive motor to selectively move said bracket (18) between said retracted and extended positions.

12. An actuating device (10) as set forth in claim 11 further characterized by said electrical control circuit (58) including an activation switch (60) movable between a first position in which said drive motor (44) drives said bracket (18) from said retracted to said extended position and a second position in which said drive motor drives said bracket from said extended to said retracted positions.

13. An actuating device (10) as set forth in claim 12 further characterized by said control circuit comprising limit means (70) for de-activating said drive motor (44) when said bracket (18) has reached one of said extended and retracted positions.

14. An actuating device (10) as set forth in claim 13 further characterized by said limit means (70) including first and second limit switches (66,68), said first limit (66) switch de-activating said drive motor (44) when said bracket (18) is in said retracted position and said second limit switch (68) de-activating said drive motor (44) when said bracket is in said extended position.

15. An actuating device (10) as set forth in claim 14 further characterized by relay means (76) for switching the direction of electrical current passing through said drive motor (44) when said activation switch (60) is moved between said first and second positions.

16. An actuating device (10) as set forth in claim 15 further characterized by said relay means (76) including two relays (62,64) each electrically connected between said activation switch (60) and ground, each of said two relays including a wire coil and a plunger such that said plunger moves axially with respect to said wire coil upon electrical current passing though said wire coils.

17. An actuating device (10) as set forth in claim 16 further characterized by one of said two relays (62,64) operating a first drive motor switch (82) between a ground position and an activation switch position.

18. An actuating device (10) as set forth in claim 17 further characterized by the other of said two relays (62, 64) operating a second drive motor switch (84) between a first limit switch position associated with said first limit switch (66) and a second limit switch position associated with said second limit switch (68).

19. An actuating device (10) as set forth in claim 5 further characterized by said drive member (30) including an elongated member (36) extending radially outward from said cylindrical portion (34).

20. An assembly as set forth in claim 1 further characterized by said safety unit including an indicator (12) having an indicia of a conventional STOP sign.

21. An assembly as set forth in claim 1 further characterized by said safety unit including an elongated member (12') comprising a safety gate.

* * * * *